United States Patent Office 3,606,395
Patented Sept. 20, 1971

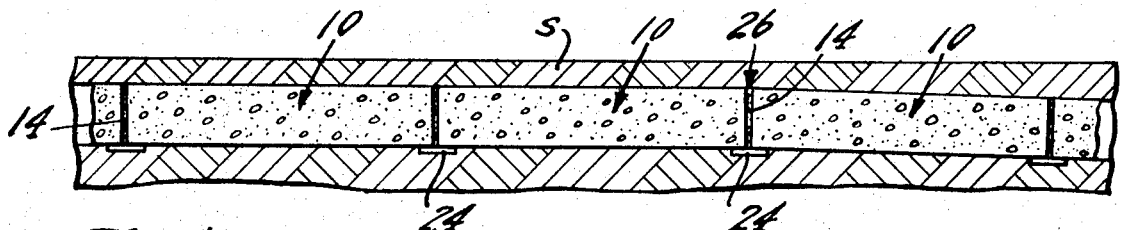
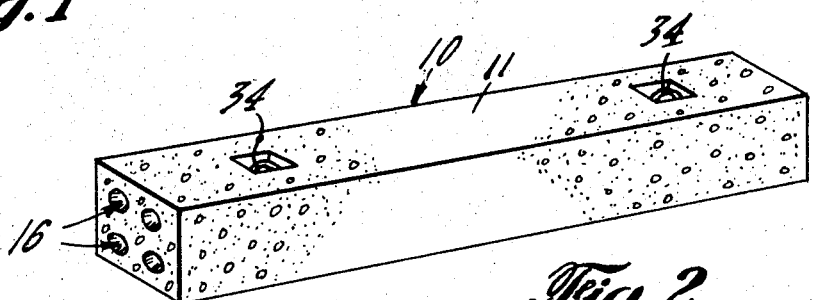
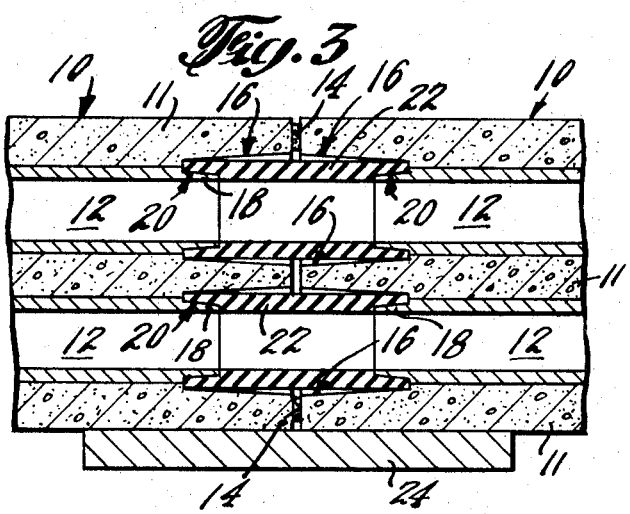
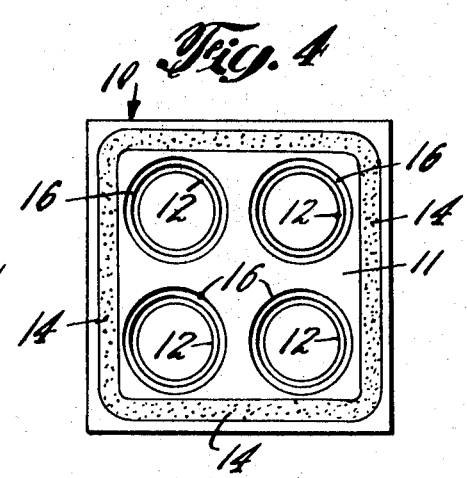
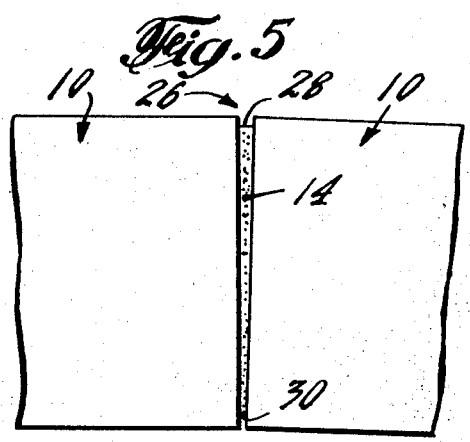
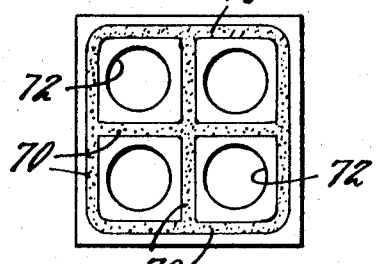

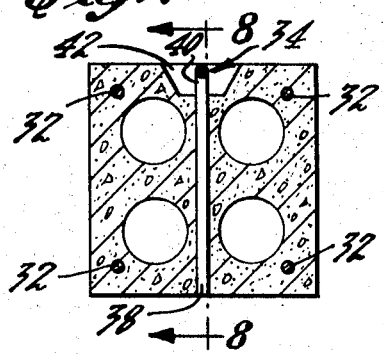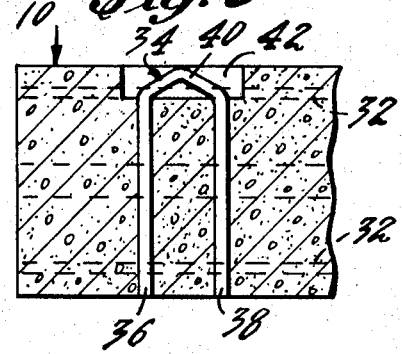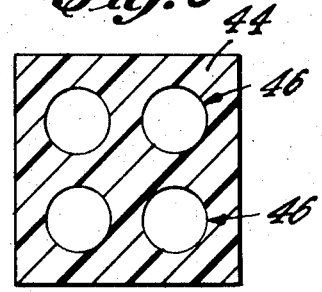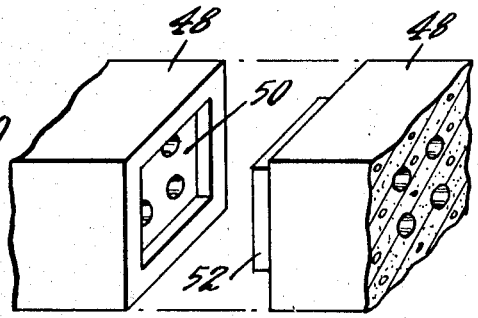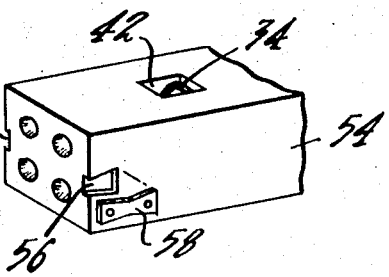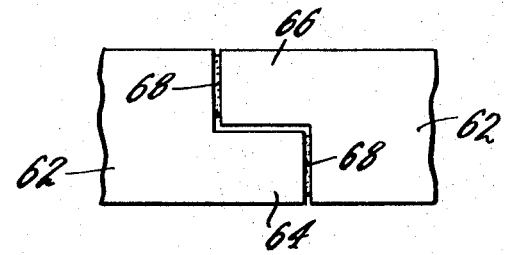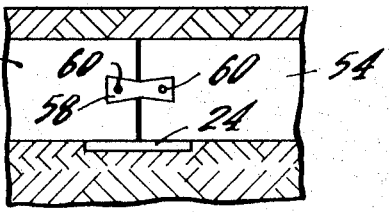

3,606,395
METHOD AND APPARATUS USING PREFORMED CONDUITS
Phillip Salerno, Brooklyn, and Michael Sammaritano, Bayshore, N.Y., assignor of a fractional part interest to Angelo Raffa
Continuation-in-part of application Ser. No. 808,452, Mar. 19, 1969. This application Aug. 4, 1969, Ser. No. 847,342
Int. Cl. F16l 39/00
U.S. Cl. 285—137R
5 Claims

ABSTRACT OF THE DISCLOSURE

A method and apparatus used in laying underground cables, electrical wires and the like consists of preforming conduit sections having a plurality of spaced ducts for the electrical cables, wires and the like. The preformed conduit sections are placed in a trench below the normal level of the ground and their longitudinal ends are joined to one another to form continuous ducts within the conduit sections. The preformed conduit sections are sealed by a sealing compound between the longitudinal ends of two conduit sections to be joined.

---

This is a continuation-in-part application of our copending application Ser. No. 808,452, filed Mar. 19, 1969.

The use of preformed conduit sections for electrical cables and the like overcomes fabrication problems inherent in the presently used, poured-in-place concrete multiple duct bank systems. When the concrete is poured in place at the job site, the uncertainty of the weather and other seasonal factors of working with concrete result in delays and other difficulties. In addition to the weather, other factors at the job site, such as terrain, accessibility and intricate distribution layout, contribute to the problems attendant the use of known methods involving pouring concrete in place at the job site.

According to the present invention, conduit sections having ducts therein for the electrical cables, wires and the like are preformed at a manufacturing location and subsequently shipped to the job site where they are readily installed in an open trench, independent of the type of weather conditions and other seasonal factors which adversely affect pouring of concrete at the job site. The preformed conduit sections may be manufactured in standard lengths and sizes to accommodate various multiple duct arrangements and fittings for all forms of direction change may be used in conjunction therewith.

Accordingly, an object of the present invention is to provide a method and apparatus utilizing preformed conduit sections which result in a savings in installation time and overall installation costs, which may be installed in any weather with a minimum disturbance of the job site and which incorporates a design flexibility and adaptability to future additions and revisions wherein preformed sections may be stacked or laid aside for future use.

Additional objects, advantages, and features of the invention will become apparent during the course of the following specifications when taken in connection with the accompanying drawings in which:

FIG. 1 is an elevational view of a plurality of preformed conduit sections joined to one another and located underground.

FIG. 2 is a perspective view of a complete preformed conduit section.

FIG. 3 is a partial, horizontal, longitudinal section showing the ends of two conduit sections which have been joined to one another.

FIG. 4 is an end view of a conduit section showing the sealing compound utilized in sealing longitudinal ends of adjacent conduit sections.

FIG. 5 is a partial elevation view of the ends of two adjacent conduit sections, one of which is angularly disposed relative to the other.

FIG. 6 is an end view of a conduit section showing an alternate arrangement of applying the sealing compound wherein the latter is disposed around each of the pipes in the conduit section.

FIG. 7 is a transverse sectional view showing the hook used to facilitate lifting of the conduit section.

FIG. 8 is a sectional view looking substantially along the line 8—8 of FIG. 7 showing a longitudinal section adjacent the lifting hook.

FIG. 9 is an end view of an alternative conduit section in which separate internal pipes are dispensed with and the entire conduit section is made in one piece.

FIG. 10 is a perspective view of an alternative arrangement for joining the longitudinal ends of two conduit sections.

FIG. 11 is a partial elevation of a further alternative arrangement for joining the longitudinal ends of two conduit sections.

FIG. 12 is a perspective view of a conduit section showing a further alternative method utilizing a locking plate and dovetail recess for joining two conduit sections.

FIG. 13 is a partial elevational view of two conduit sections joined to one another by the locking plate and dovetail method shown in FIG. 12.

DESCRIPTION OF THE PREFERRED EMBODIMENTS

Before explaining the present invention in detail, it is to be understood that the invention is not limited in its application to the details of construction and arrangement of parts illustrated in the accompanying drawings since the invention is capable of other embodiments and of being practiced or being carried out in various ways. Also it is to be understood that the phraseology or terminology employed is for the purpose of description and not of limitation.

Referring to the drawings in which like parts are similarly designated, FIG. 1 shows a plurality of preformed conduit sections, each section being designated generally by the numeral 10, located underground, the surface of the ground being designated S. Each of the conduit sections 10 are joined to one another at their longitudinal ends to form a continuous, uninterrupted conduit. The conduit sections 10 may be used in various applications where it is desired to lay underground cables or wires. They may be used, for example, at airports for carrying electrical wires and cables to various buildings, communication centers, and flight control locations.

Turning to a more detailed description, FIG. 2 shows a completed, preformed conduit section 10. Each conduit section 10 has included therein a plurality of pipes 12 (four are shown in the illustrated embodiment) which extend parallel to one another but which are spaced from one another so that each pipe 12 may be completely surrounded by concrete 11.

As can best be seen in FIG. 3, the longitudinal ends of two conduit sections 10 are joined to one another by utilizing a sealing compound 14 extending generally around or adjacent the peripheral edge of the longitudinal ends surfaces of the two adjacent conduit sections 10 to be joined. This sealing compound 14 will be hereinafter described in greater detail.

Each of the four pipes 12 in the conduit section 10 terminates short of the longitudinal end of the conduit section, and a frusto-conical opening 116 is provided in the concrete of the conduit section at the longitudinal end of each pipe 12. The longitudinal end of each pipe 12 extends or projects partially into this frusto-conical section 14 and such extending or projecting ends may be tapered as indicated at 18 in FIG. 3, such taper being in the direction opposite to the taper of the frusto-conical opening 16 within the concrete at the end of each pipe 12. With this arrangement, it will be seen that an annular space 20 which gradually narrows is provided between the other walls of the end section of the pipe 12 and the walls of the frusto-conical opening 16.

In order to complete the assembly, connecting sleeves 22 are utilized to connect two longitudinally aligned pipes 12 in adjacent conduit sections 10. The connecting sleeves 22 may have an inner diameter equal to the inner diameter of the pipes 12 which they connect. Each connecting sleeve 22 may be made of a fiber material which is somewhat compressable so that the longitudinal ends thereof may be wedged or compressed into the gradually narrowing annular space 20, previously described, formed between the tapered end of the longitudinal pipe 12 and the inner depth of the frusto-conical opening 16 in the concrete. Alternatively, the longitudinal ends of the connecting sleeve 22 may be slightly tapered to facilitate accommodation within the aforementioned annular tapered space 20.

The connecting sleeves 22 are initially inserted in each of the frusto-conical openings 20 on the ends of one of the conduit sections to be joined and a bead of sealing compound 14 is placed on the longitudinal end of the conduit section around or adjacent the perpherial edge thereof as shown in FIG. 4. The two longitudinal ends of the conduit sections to be joined are then brought together to the position shown in FIG. 3 wherein the connecting sleeves 22 slide into position into the previously described annular tapered spaces 20 between the tapered ends of the pipes 22 and the bottom of the frusto-conical sections 16. At the same time, the sealing compound 14 is squeezed and compressed somewhat and spread out to form a watertight seal around the joint. It will be apparent, that the sealing compound 14 extending around the periphery of the joint will provide a watertight seal between all the pipes 12 and the outside of the conduit sections 10.

Since the conduit sections 10 are adapted to be utilized underground, a metal plate 24 or the like may be located beneath the end of one of the conduit sections 10 before the joint is made up. The plate 24 extends beyond the longitudinal end of said one conduit and the other conduit section is adapted to slide therein when the joint is made up to facilitate bringing the two longitudinal ends together in the proper disposition.

As can be seen at 26 in FIGS. 1 and 5, there may be cases when two adjoining conduit sections 10 may not be in longitudinal alignment. This may occur, for example, when the earth settles more in some sections than others, when the rain tends to erode the supporting ground more in some places than in others, as a result of human error, and in some cases by intentional design. The sealing compound 14 utilized forms a flexible, rubber-like seal and is able to tolerate such misalignment and still maintain its watertight seal. Accordingly, the sealing compound 14 may initially be put on with an even thickness all around the joint between two conduit sections which are in longitudinal alignment. If such conduit sections should become misaligned after installation and not return to their original position, the properties of the sealing compound 14 will allow it to expand (e.g. at 28 in FIG. 5) where required, and to compress (e.g. at 30 in FIG. 5) where required while still maintaining a watertight seal. In other words, the sealing compound 14 is adaptable to accommodate itself to varying exigencies encountered in every day practical application. In other cases where a slight misalignment may be desired, for example, to avoid an obstacle or to make a turn, additional sealing compound 14, may be applied in the wider area of the joint than in the narrower area. Thus, as shown in FIG. 5 a greater amount and thickness of sealing compound 14 will be applied at the top portion 28 of the joint as opposed to the bottom 30.

An example of a sealing compound which may be used is an elastomeric sealing compound in the form of a polysulfide polymer sealant. An example of this is polysulfide polymer sealant sold by Dewey, Almy Chemical Div., W. R. Grace & Co. under the trademark "Hornflex" and based on "Thiokol" polysulfide liquid polymer. An alternative sealing compound is epoxy mortar compound.

Each conduit section 10 may be provided with longitudinally extended reinforcing rods 32 and lifting hooks 34 as shown in FIGS. 7 and 8. Although there are four reinforcing rods 32 shown in FIG. 7, it will be understood any number of such rods 32, may be used as required. Similarly, any number of lifting hooks 34 may be used depending on the size of the conduit section 10. The rods 32 and hooks 34 may be made of iron, steel or other metal of comparable strength. Each lifting hook 34 is formed generally as an inverted U having two vertical legs 36, 38 joined to a central section 40 which is exposed and not covered with concrete. A suitable indentation 42 may be provided in the concrete of the conduit section about the central portion of each lifting hook 34 whereby said central portion 40 is exposed and accessible to receive a lifting hook or the like from a crane or other lifting device. It will be observed that the two legs 36, 38 of the lifting hook are aligned in a plane extending longitudinally of the conduit section 10.

The conduit sections in the illustrated embodiment heretofore described related to concrete conduit sections having reinforcement means therein in the form of metal rods 32 and having pipes 12 running through. These pipes 12 may be made of various materials such as fiber, polyvinylchloride, transite steel, plastics (e.g. Bakelite), porcelain and the like.

As an alternative arrangement, each conduit section 44 (FIG. 9) may be made of one homogeneous material without any pipes 12 encased therein. In such a case, each conduit section 44 would have the required number of longitudinal ducts 46, the walls of which are formed by the conduit section itself, for the electrical wires and cables. The section 44 may be made by extruding the particular material utilized. Examples of materials which may be used are plastics, (e.g. polyvinylchloride, styrene), Bakelite and its derivatives, and hard materials such as natural hard rubber and synthetic rubber. Other examples of materials are porcelain and any type of nonfusible insulating material.

As an alternative arrangement for joining two conduit sections, the latter may be provided with longitudinal ends arranged as shown in FIG. 10. In this figure it will be seen that the longitudinal end of one conduit section 48 has a central indentation 50 into which a central projecting part 52 on the longitudinal end of the other conduit section is adapted to fit. As in the main embodiment, suitable connecting sleeves and sealing compound may be utilized to suitably effect the watertight joint between the conduit sections.

A further alternative embodiment is shown in FIGS. 12 and 13. In this embodiment, the sides of each conduit section 54 are provided with a dovetail recess 56 with the smaller or narrower end of dovetail recess 56 located adjacent the longitudinal end of the conduit section 54. Dovetail recesses 56 of adjoining conduit sections 54 are adapted to align with one another so that a mating dovetail locking plate 58 may be placed in position to lock the two adjoining conduit sections 54 to one another. It will be apparent that because of the taper of the recesses 56 and of the locking plate 58 that the latter will prevent the two conduit sections 54 from being pulled apart or separated from one another. Suitable anchor means in the way of anchor bolts or studs 60 may be embedded in the conduit sections within the recesses to hold the locking plate 58 in place.

FIG. 11 shows a further alternative arrangement wherein the longitudinal ends of two adjoining conduit sections 62 are provided with half sections 64, 66 at their longitudinal ends which are adaptable to overlap one another. This arrangement offers the advantage that when one conduit (e.g. the left hand one in FIG. 11) is in position, the second one may be lowered or tilted into position when using its remote end as a pivot as it rests on the ground. In this case, the conduit sections 62 will not have to be slid longitudinally except perhaps for minor adjustment and to slightly squeeze or compress the sealing compound 68 upon final completion of installation. In this alternative arrangement, connecting ducts may be dispensed with and sealing compound 68 utilized to complete a peripheral seal around each separate duct in which the electrical wires and cables are to be carried.

In cases where connecting sleeves 22 are not used, sealing compound 70 may be initially applied around each duct 72 as shown in FIG. 6. It will be understood that the illustrated arrangements may be combined in various combinations to join the preformed conduits.

The aforesaid described preformed conduits may be manufactured in standard lengths and sizes to accommodate various and multiple duct arrangements. Fttings for all forms of direction change may also be utilized. The conduit sections may be installed in any weather with minimum disturbance of the job site and they are adaptable to future additions and revisions.

It will be understood that although four pipes 12 and ducts 46, 72 are shown in the drawings, any number of pipes or ducts may be used. Also instead of being square as illustrated, the cross section of the conduit sections may be circular or take on some other configuration. The pipes 12 may be made of fiberglass, plastic, fibrous compounds, metal, or other suitable material.

The conduit sections may be made of standard lengths but shorter lengths may be made to fill in shorter spaces, for example, between a manhole and the end of a conduit section leading thereto. It will be apparent that use of the conduit sections herein described eliminates the necessity of having to pour concrete in the field when the cable or electrical wires are being laid. The conduit sections may be made in a factory and stored until ready for use. When they are used, it is only necessary to dig a ditch, lay the conduit sections therein, and couple them as previously explained.

It is thought that the invention and many of its attendant advantages will be understood from the foregoing description and it will be apparent that various changes may be made in the form, construction and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

What is claimed is:

1. The combination comprising a preformed conduit for cables, electrical wires and the like, said preformed conduit having a plurality of spaced ducts therein for said wires and cables, a second like preformed conduit in longitudinal alignment with said first conduit, coupling means joining said two conduit sections to form continuous ducts within said two preformed conduits, said ducts being formed by pipes encased within said preformed conduits, said pipes terminating short of the longitudinal ends of said preformed conduits and having end portions projecting into frusto-conical openings provided within the preformed conduits at the longitudinal end of each pipe, and connecting sleeves extending between longitudinally aligned pipes, said end portions of said pipes having a frusto-conical configuration whereby the outer walls of the latter and the inside walls of the frusto-conical openings in the end of the preformed conduits define gradually thinner annular spaces in which the ends of said connecting sleeves are wedged.

2. A preformed conduit comprising a longitudinal extending body of concrete, a plurality of spaced pipes extending in said body substantially parallel to one another and spaced from one another so that each pipe is completely surrounded by said concrete, a second like longitudinal extending body of concrete in longitudinal alignment with said first body, said pipes terminating short of the longitudinal ends of said bodies, each of said bodies having a plurality of passages formed in said concrete axially aligned with each of said pipes and extending from the respective pipe to the longitudinal end of said bodies, whereby said passages form continuation of said pipes, coupling sleeves disposed in said passages to couple the longitudinal ends of the pipes in said first and second concrete bodies, said pipes and coupling sleeves forming continuous ducts of substantially constant inner diameter between the two bodies, and sealing means in the form of a sealing compound disposed between the longitudinal ends of said first and second bodies to join said bodies.

3. A preformed conduit according to claim 1 wherein said sealing compound is polysulfide polymer sealant.

4. A preformed conduit according to claim 1 wherein said sealing compound is disposed about the outer periphery of each coupling pipe.

5. A preformed conduit according to claim 1 wherein said sealing compound is disposed about the peripheral edge portion of each concrete body.

References Cited

UNITED STATES PATENTS

| 247,207 | 9/1881 | Mershun | 174—96 |
|---|---|---|---|
| 376,562 | 1/1888 | Van Buren et al. | 285—137R |
| 702,662 | 6/1902 | Lyle | 285—137R |
| 726,777 | 4/1903 | Smith | 285—330 |
| 1,807,847 | 6/1931 | Bobb | 285—137R |
| 3,163,448 | 12/1964 | Franklin | 285—137R |

FOREIGN PATENTS

| 1,398,943 | 4/1965 | France | 285—330 |

DAVE W. AROLA, Primary Examiner

U.S. Cl. X.R.

174—96; 285—284, 330, 339